United States Patent
Littau

Patent Number: 5,181,373
Date of Patent: Jan. 26, 1993

[54] HARVESTER WITH MOVING GUIDE

[76] Inventor: Eugene G. Littau, 8974 Shaw Square Rd., S.E., Aumsville, Oreg. 97325

[21] Appl. No.: 832,430

[22] Filed: Feb. 7, 1992

[51] Int. Cl.⁵ .......................................... A01D 46/28
[52] U.S. Cl. .......................................... 56/329; 56/330
[58] Field of Search .......................... 56/329, 330, 328.1

[56] References Cited

U.S. PATENT DOCUMENTS

| | | | |
|---|---|---|---|
| 3,184,908 | 5/1965 | Rust | 56/330 |
| 3,325,984 | 6/1967 | Christie et al. | 56/330 |
| 3,449,895 | 6/1969 | Pertics | 56/330 |
| 3,473,310 | 10/1969 | Christianson | 56/329 |
| 3,690,054 | 9/1972 | De Carlo et al. | 56/330 |
| 4,130,982 | 12/1978 | Clary | 56/330 |
| 4,134,251 | 1/1979 | Burton | 56/330 |

Primary Examiner—Stephen J. Novosad
Attorney, Agent, or Firm—Kolisch, Hartwell, Dickinson, McCormack & Heuser

[57] ABSTRACT

A fruit harvester with first and second rows of catcher plates disposed opposite each other. Inclined reciprocating guide plates bridge the distance between lower sets of ends of the rows of plates and the upper runs of associated collector belts.

9 Claims, 4 Drawing Sheets

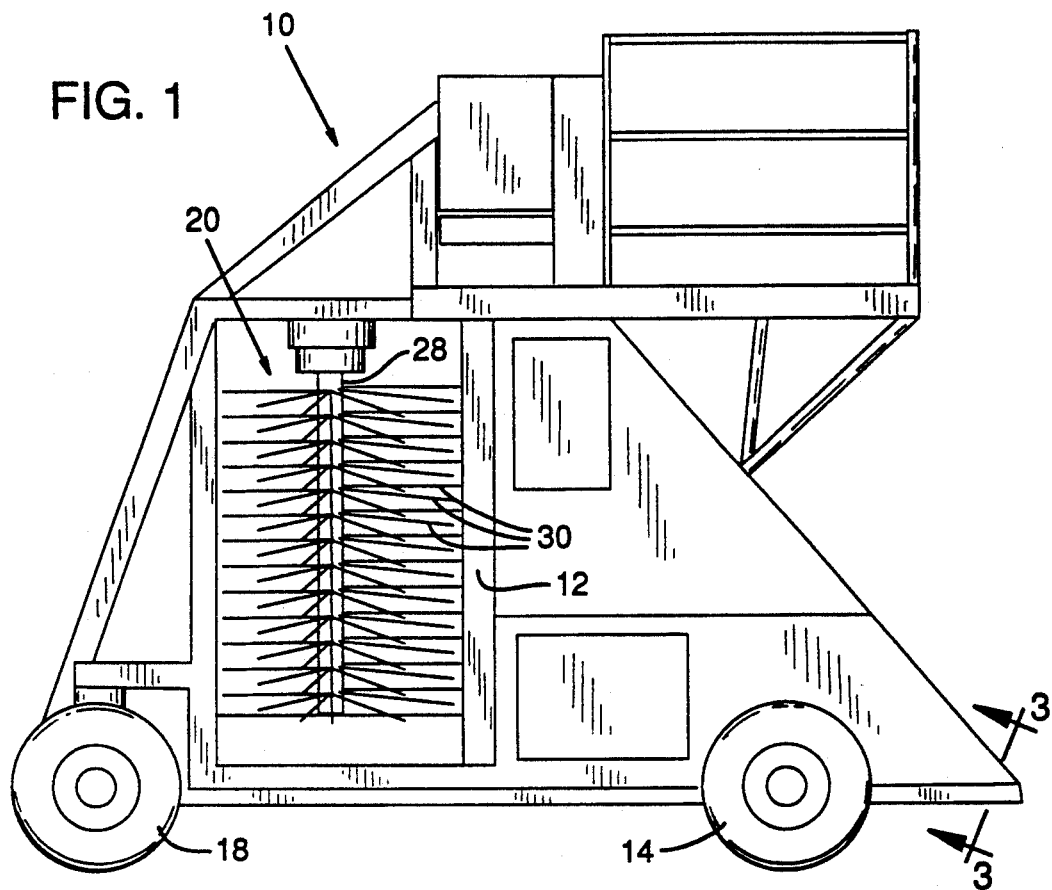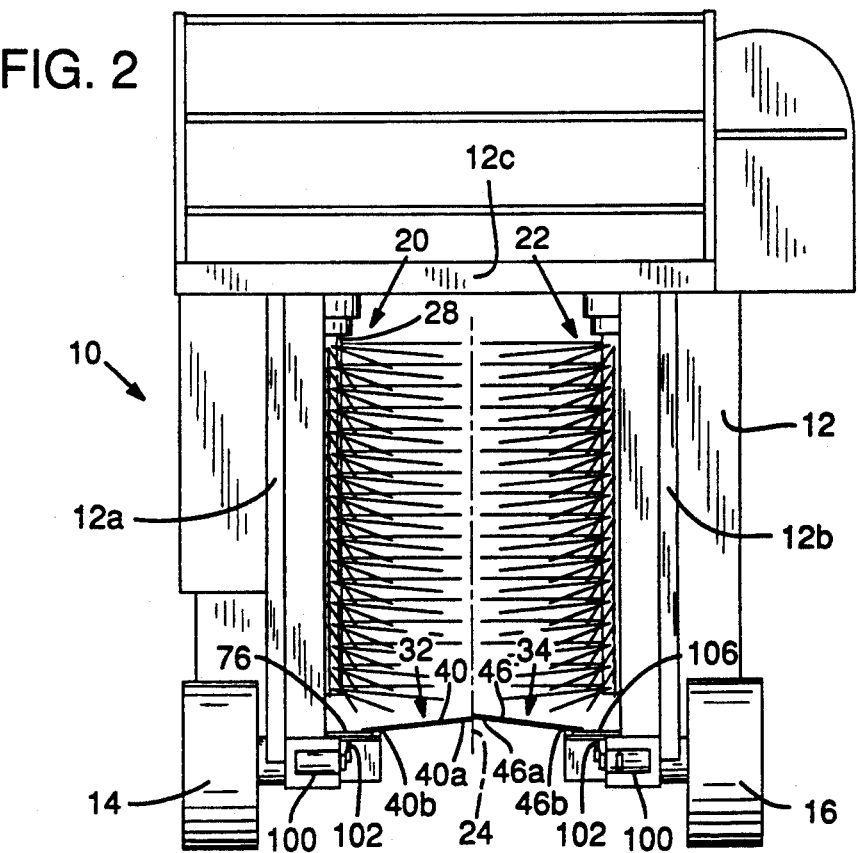

HARVESTER WITH MOVING GUIDE

BACKGROUND AND SUMMARY OF THE INVENTION

This invention relates to a harvester machine, and more particularly to a mobile harvester of the type that is adapted to be driven along a row of plants with harvesting of the fruit such as berries or beans growing on these plants effected by shaking the plants. A harvester of this description is commonly used in the harvesting of fruit such as blueberries, raspberries, etc., although in indicating these fruits, it is not intended to limit the machine of the patent to any particular product.

A conventional harvester includes a frame which is wheel-supported, and which is adapted to be driven along a row of fruit-bearing plants with the frame straddling the plants in the row. Fruit is harvested through shaking the plants with various forms of shakers, and the fruit then drops from the plants on to catcher plates, to be directed into a system which collects the fruit. Typically, catcher plates are provided which travel with the harvester and are adapted to travel under the crop-producing portions of the plants and closely adjacent the ground. The catcher plates are inclined, which is to say they slope downwardly progressing outwardly from the center of any bush being processed, so that fruit by gravity on coming into contact with the plates will move laterally outwardly on the row.

A problem that has arisen is that with the development of larger and hardier bushes, the distance that material must travel in moving laterally outwardly of a row to reach any fruit collector has increased. To generally elevate the catcher plates does not provide a satisfactory answer, since optimum harvesting results are obtained with catcher plates that move as close to the ground as possible.

What this invention generally is directed to is the provision of novel means for conveying fallen product outwardly of the bush, to permit the harvesting of product from larger bushes while still catching the product as it falls at an elevation relatively close to the ground.

More specifically, an object of the invention is to provide a novel guide means which serves to bridge the off-bearing extremities of catcher plates and a fruit collector, such as a collector belt, with the guide means serving to channel material from the plates to the belt.

More specifically, the invention contemplates a motor-operated, reciprocating, guide-plate means which by reason of its motion, serves to direct fruit from a catcher plate system to a conveyor belt.

Brief Description of the Drawings

These and other objects and advantages are attained by the invention, which is described hereinbelow in conjunction with the accompanying drawings, wherein:

FIG. 1 is a side view, somewhat simplified, illustrating a harvester constructed pursuant to the invention;

FIG. 2 is an end view of the harvester, line 2—2 in FIG. 1;

DETAILED DESCRIPTION OF A PREFERRED EMBODIMENT

Figure 3:
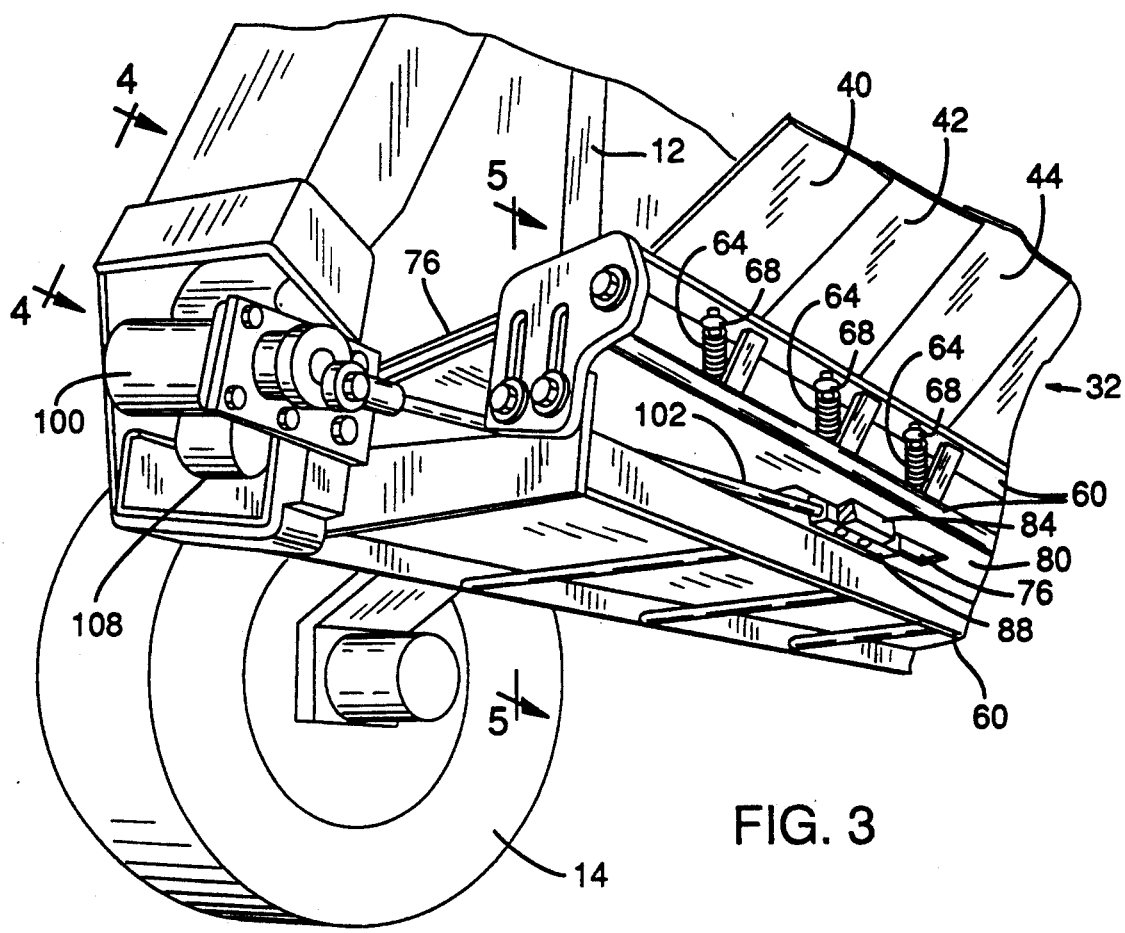
FIG. 3 is a somewhat enlarged, perspective view of portions of the end of the harvester, viewed approximately from the line 3—3 in FIG. 1.

Referring now to the drawings, a harvester such as may be employed in the harvesting of a row crop, is indicated generally at 10. The harvester includes a movable frame 12 supported for movement over the ground by wheels provided adjacent forward and rear extremities of the harvester frame. Specifically such may comprise a pair of power-driven rear traction wheels 14, 16 and a forward steerable wheel 18.

The frame includes opposite sides 12a and 12b and an upper cross expanse 12c joining upper extremities of the frame sides. The harvester when used is driven along the row of the product to be harvested, for instance, a row of raspberry bushes, with frame 12 straddling the row and sides 12a, 12b on opposite sides of the row. Steering of the harvester during such travel is performed by turning wheel 18 which is at the forward end of the vehicle.

Carried adjacent the forward end of the vehicle are a pair of rotatable shakers 20, 22. When the harvester is used, the harvester is driven down a row with the center of the row substantially midway between the sides of the harvester frame. Thus, the center of the row being harvested substantially coincides with the dot-dash line 24 in FIG. 2 which bisects the vehicle frame.

Shakers 20, 22 are equally spaced on either side of the center line. Each includes an elongate upright shaft, such as the one shown at 28, suitably rotatably supported in the harvester. The shaft mounts elongate flexible fingers 30 and which project outwardly from the shaft and which move inwardly to penetrate the berry bush with the vehicle moving along the row and with the shaker rotated to compensate for vehicle travel. In addition to rotating, a shaker may conventionally be subjected to movement such as oscillatory up and down movement, or back-and-forth rotatory movement, as is known in the art, and for the purpose of more rapidly dislodging fruit from the bush through the vibratory action imparted to the bush by this movement.

Material dropping from the bushes processed drops downwardly on being dislodged from the bushes and falls on one or the other of an elongate row of catcher plates provided on each side of the vehicle. In FIG. 2, one row of these catcher plates is indicated at 32 and the opposite row at 34. Each row of plates extends substantially the entire length of the vehicle.

Figure 4:
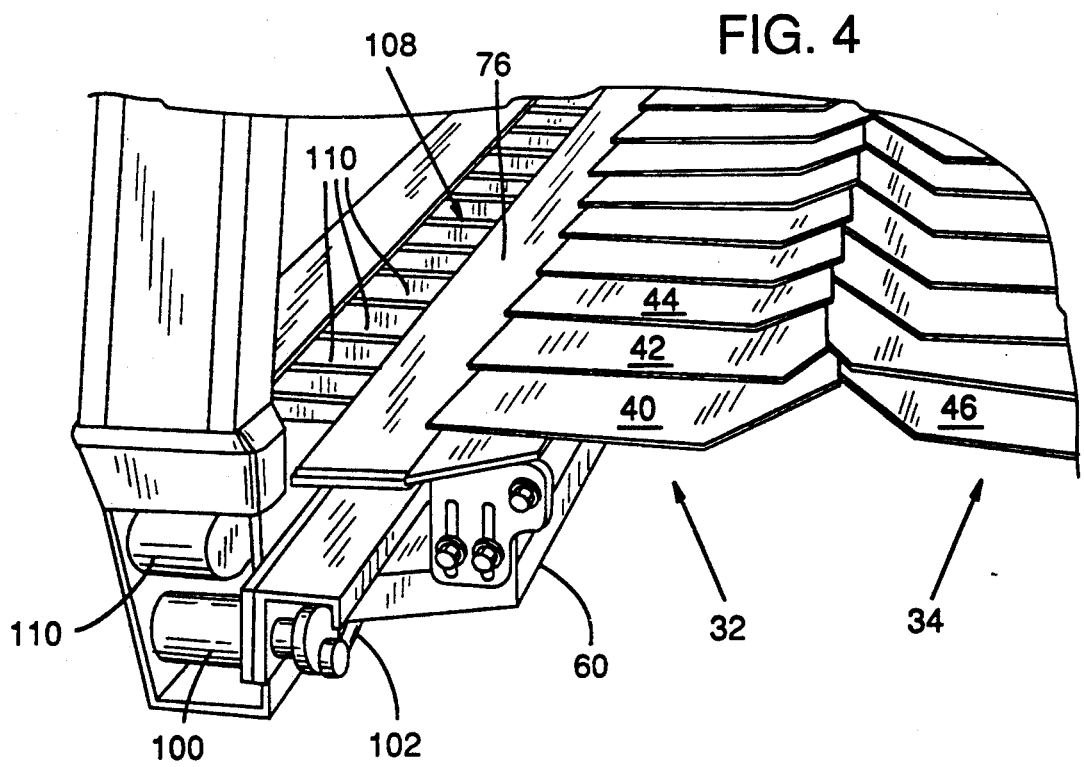
FIG. 4 is a perspective view looking downwardly at portions of the harvester illustrated in FIG. 3, from approximately the line 4—4 in FIG. 3.
Figure 5:
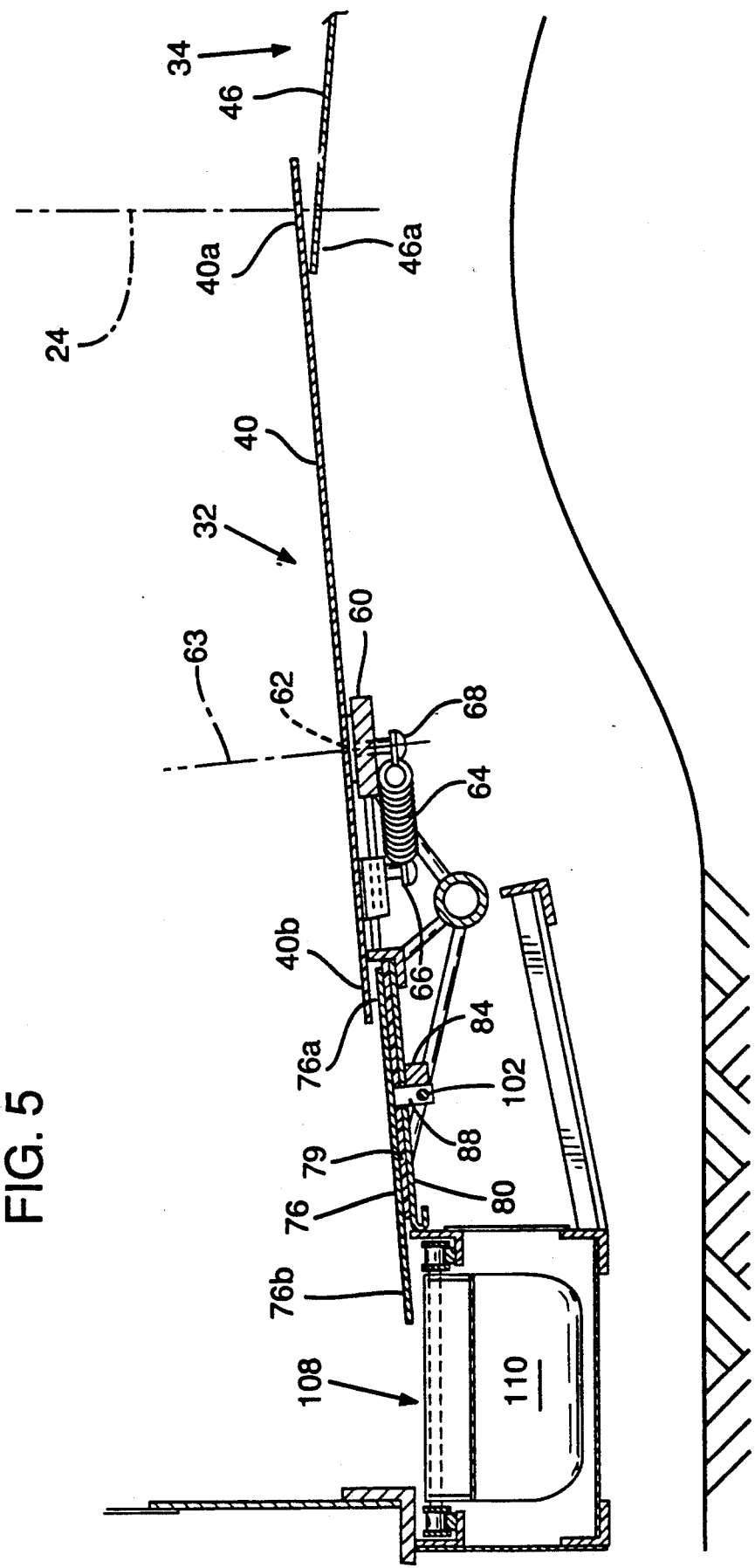
FIG. 5 is a cross-sectional view, taken along the line 5—5 in FIG. 3.

Referring now also to FIGS. 3, 4, and 5, each row of catcher plates includes multiple flat plates following one another along the row and with the plates overlapped. This is exemplified by plates 40, 42, and 44 in row 32, and plates such as plate 46 in row 34. The plates have an upper set of ends, as exemplified by ends 40a, 46a of plates 40, 46, and a lower set of ends, as exemplified by ends 40b, 46b of plates 40, 46. The plates in a row occupy an inclined plane, with the plane of a row inclining downwardly, or toward the ground progressing in a direction extending from the upper to the lower sets of ends of the plates in the row. Thus, plate 40 and the other plates in row 32 incline downwardly progressing from right to left in FIG. 5, and plate 46 and other plates in row 34 incline downwardly progressing from left to right in FIG. 5.

Referring still to FIG. 5, each of the plates is pivotally mounted at 62 for pivotal movement about an axis 63 which is essentially normal to the frame of the plate. This pivot mounting pivotally supports a lower portion of a plate on a frame member 60 which is part of the harvester frame. The pivot mountings for the plates enable upper ends of the plates to swing laterally outwardly and away from center 24 to the extent necessary to accommodate the passage therebetween of the cane growth in a row of raspberry bushes. With the plates in a row overlapped, a slide surface is presented to the falling berries functioning to slidably catch these berries and deflect such laterally outwardly with the berries sliding downwardly on the inclined surfaces of the catcher plates.

As discussed earlier, it is desirable, for most effective harvesting of the fruit from many plants, to provide a system for conveying the fruit laterally outwardly beyond the laterally outer extremities of the sets of catcher plates. The incline of the rows of catcher plates is selected so as to be sufficient to cause fruit to move down their upper surfaces in an orderly manner and without hanging up. It is possible to mount the plates at a lesser incline, whereby for a given drop in elevation, a greater laterally outward distance is covered, but with too shallow an incline fruit movement is adversely affected.

What this invention contemplates is the provision of guide means receiving fruit from the lower extremities of the catcher plates described, and further conveying the product laterally outwardly to a collector conveyor. Further, this guide means is oscillated, so that with only a slight incline, assurance is had that the guide means is effective to channel fruit laterally outwardly as intended. The guide means for the lower set of ends of each row of plates forms a bridge between these ends and a collecting conveyor disposed further laterally outwardly of the mid-line of the harvester.

Each catcher plate, while pivotally mounted by its pivot mounting 62 to enable its upper end to swing laterally outwardly, has a spring operatively connected to it yieldably resisting this movement. Exemplifying this spring is the coil spring shown at 64 in FIG. 5, which has one end anchored at 66 to a catcher plate and its opposite end anchored at 68 to frame 60 of the harvester.

Describing the guide means which is provided for each row of catcher plates, and considering the row of plates 32, shown at 76 is an elongate guide plate extending along the length of the harvester. In FIG. 5, the transverse cross section of this guide plate 76 is illustrated. The guide plate has a slight transverse incline. Thus, as best seen in FIG. 5, the guide plate has an upper margin 76a which is directly under the lower set of ends of the catcher plates in row 32. It has an opposite margin 76b spaced outwardly from the upper margin which is at a somewhat lower elevation than the elevation of the upper margin.

The guide plate is slidably supported on a mounting plate 80 which extends thereunder. Interposed between guide plate 76 and mounting plate 80 is a wear plate 79.

Figure 6:
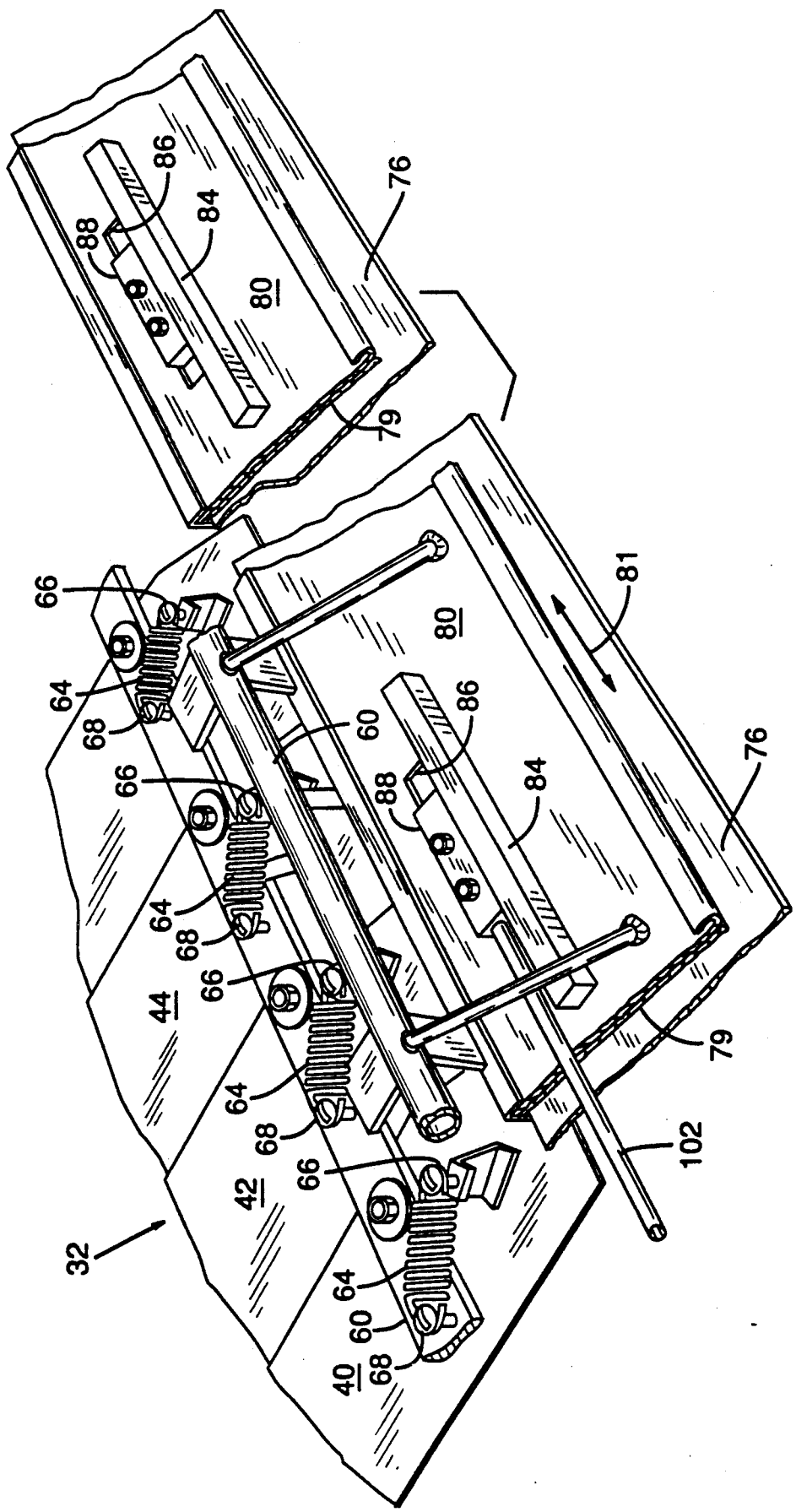
FIG. 6 is a perspective view of portions of the underside of a guide means in the apparatus, viewed approximately from the line 6—6 in FIG. 4.

During operation of the harvester, the guide plate is reciprocated, under power, back and forth, in the direction of its length. This is in the direction of the double-pointed arrow 81 in FIG. 6. This reciprocation in the plate, and because of the slight transverse incline described, is effective to cause any product on the plate to travel across the plate and further outwardly on the harvester. Because of the reciprocatory or oscillatory movement of the guide plate, the transverse incline of the plate need not be as great as any incline required to produce fruit movement merely as a result of gravity induced sliding.

Guiding movement of the guide plate in its back-and-forth movement are rail or track members 84 provided at intervals along the underside of mounting 80. Cutouts 86 expose the underside of the guide plate through mounting slot 80. Connected to the underside of the guide plate and extending through each cutout and riding on a rail member is a shoe 88.

Back-and-forth or reciprocatory movement in guide plate 76 is produced under power. Toward these ends, a hydraulic motor may be provided, such as the one shown at 100 in FIG. 3. The output shaft of the hydraulic motor is connected through an eccentric to a rod 102. Rod 102 extends from the motor to a connection with the guide plate. With operation of the motor, the eccentric is rotated and rod 102 moved generally in a back-and-forth direction. A spring (not shown) may also be provided, interposed between the guide plate and the frame of the machine, which is operable to urge the guide plate in one direction.

A similar guide plate 106 (see FIG. 2) extends along the length of the machine adjacent the lower set of ends of the plates in row 34. While not described in detail, it should be understood that plate 106 is provided with a mounting, and a means for reciprocating the plate under power, similar to the mounting structure and motor described in connection with plate 76.

Associated with each row of catcher plates is a fruit collector conveyor belt 108 (see FIG. 4). The belt is mounted with a run of the belt extending along the length of the harvester and generally parallelling the row of catcher plates and center line 24. The inner margin of the belt run is adjacent and disposed under the outer set of ends of the catcher plates in a row. The conveyor belt may have a construction such as that illustrated in FIG. 4, where successive pockets 110 appear on the length of the belt better to enable the belt to collect the material falling thereon from the oscillating guide plate.

A suitable drive means produces powered movement of the collection belt. Suitable means may be provided for dumping fruit material from the conveyor belt, and transporting it to other regions on the harvester.

Operation of the harvester should be obvious from the above description. As the harvester is driven along a row of plants, such as raspberry bushes, the harvester is steered so that the row passes between the catcher plates while travelling generally along mid-line 24. As the bushes progress between the catcher plates, the plates swing outwardly to permit passage of the bushes therebetween. Shaking of the bushes occurs with operation of the shakers, and fruit falls downwardly to fall against the catcher plates and then slide laterally outwardly.

On reaching the lower set of ends of the catcher plates in a row, the fruit cascades onto an oscillating guide plate. The fruit then travels down the slight transverse incline of the plate to be deposited upon the upper run of a conveyor belt 108.

The reciprocating guide plate, in effect, provides a very easily maintained and compact conveyor system for conveying fruit from the catcher plates to a collector conveyor belt. The invention provides, therefore, a very practical maintenance free system for effectively increasing the lateral dimension of the conveyor system at the base of the harvester, without the need to increase the inner elevation of the catcher plates.

While an embodiment of the invention has been described herein, obviously modifications and variations are possible. It is desired to cover all such modifications and variations with the invention being hereinafter set forth in the appended claims.

It is claimed and desired to secure by letters patent:

1. In a harvester having a mobile frame mounted for movement over the ground,
   a row of multiple catcher plates carried by the frame with the plates being movably supported by the frame to accommodate the movement of plants thereby,
   collector means for collecting harvested material falling on the catcher plates,
   a reciprocating guide means adapted to receive product moving from the collector plates and to direct such material onto the collector means, and
   powered means for producing reciprocation of the guide means.

2. The harvester of claim 1, wherein the catcher plates are disposed in a common inclined plane having an upper and a lower set of ends, and the guide means comprises plate means extending from and forming a bridge between the lower set of ends of the catcher plates and the collector means.

3. The harvester of claim 2, wherein the collector means is an elongate powered conveyor belt having an elongate upper run and mounted with its upper run spaced from the lower sets of ends of the catcher plates.

4. The harvester of claim 1, wherein said catcher plates are pivotally mounted on the frame and are disposed in a common inclined plane and have an upper and a lower set of ends, the lower set of ends extending in a row, and said guide means comprises elongate plate means generally parallelling the row of the lower set of ends of the catcher plates and inclined in a direction extending transversely of its length.

5. In a fruit harvester,
   a mobile frame,
   a row of multiple catcher plates carried by the frame, the catcher plates having an upper set of ends and a lower set of ends and collectively lying in a plane that inclines in a direction extending transversely of the row, means pivotally mounting the catcher plates for pivotal movement about parallel axes extending normal to this plane,
   an elongate guide plate extending adjacent the lower set of ends of the catcher plates,
   a reciprocation accommodating mounting for the guide plate, supporting the guide plate with the plate transversely inclined,
   a fruit gathering conveyor belt having an elongate upper run mounted with said upper run parallelling the guide plate and disposed under a margin of the guide plate, motor means for moving the belt, and
   a reciprocation producing motor means connected to the guide plate producing reciprocation of the guide plate.

6. The fruit harvester of claim 5, wherein the reciprocation accommodating mounting comprises track elements defining a path of movement for the guide plate with said path extending substantially parallel to the upper run of the conveyor belt, and runner means on the guide plate engaging the track elements.

7. The fruit harvester of claim 6, wherein said track elements define a path of movement for the guide plate which extends parallel to the length of the plate.

8. A fruit harvester having a first row and a second row of catcher plates disposed with the rows generally parallel to each other, the plates of said first row having an upper set of ends and the plates of said second row having an upper set of ends and said upper sets of ends being adjacent, the plates of the first row of plates inclining downwardly progressing from their upper set of ends and the plates of the second row inclining downwardly progressing from their upper set of ends, the plates of the first row having a lower set of ends and the plates of the second row having a lower set of ends,
   a collector belt having an elongate upper run generally parallelling the first row of catcher plates with the belt run spaced from and below the lower set of ends of the first row of plates and a second collector belt with an elongate upper run generally parallelling the second row of plates and spaced from and below the lower set of ends of the second row of plates,
   a reciprocating guide means bridging the distance between the lower set of ends of the first row of catcher plates and the upper run of the first collection belt, and a second reciprocating guide means bridging the distance between the lower set of ends of the second row of plates and the upper run of the second collector belt, and means for producing reciprocation of said first guide means and said second guide means under power.

9. The fruit harvester of claim 8, which includes a mounting for the first guide means mounting the guide means for reciprocation in a direction generally parallelling the first row of catcher plates, and a mounting for the second guide means mounting the guide means for reciprocation in a direction generally parallelling the second row of catcher plates.

* * * * *